United States Patent [19]

Beach

[11] 4,181,647
[45] Jan. 1, 1980

[54] PROCESS FOR EXTRUSION COATING OF A WIRE WITH A CELLULAR THERMOPLASTIC RESIN MATERIAL

[75] Inventor: Shirley Beach, Vancouver, Canada

[73] Assignee: Phillips Cables Limited, Brockville, Canada

[21] Appl. No.: 735,948

[22] Filed: Oct. 27, 1976

Related U.S. Application Data

[63] Continuation-in-part of Ser. No. 431,495, Jan. 7, 1974, abandoned.

[30] Foreign Application Priority Data

Jan. 11, 1973 [CA] Canada .................................. 161082

[51] Int. Cl.² ............................................ B29D 27/00
[52] U.S. Cl. ...................... 264/45.9; 264/50; 264/53; 264/54; 264/174; 264/211; 264/DIG. 5; 264/DIG. 13; 264/DIG. 18; 366/81; 366/89
[58] Field of Search .................. 264/53, 211, DIG. 5, 264/45.5, DIG. 13, DIG. 18, 50, 45.9, 174; 366/81, 89

[56] References Cited

U.S. PATENT DOCUMENTS

| | | | |
|---|---|---|---|
| 3,121,914 | 2/1964 | Olson et al. ........................... | 264/211 |
| 3,160,688 | 12/1964 | Aykanian et al. ...................... | 264/53 |
| 3,287,477 | 11/1966 | Vesilind ................................ | 264/53 |
| 3,440,309 | 4/1969 | Breukink et al. ...................... | 264/53 |
| 3,676,034 | 7/1972 | Wendricks ....................... | 425/208 X |
| 3,751,015 | 8/1973 | Hensen et al. .......................... | 366/81 |
| 3,762,693 | 10/1973 | DeBoo et al. ........................... | 366/81 |
| 3,787,542 | 1/1974 | Gallagher et al. ................. | 264/53 X |
| 3,814,779 | 6/1974 | Wiley ............................ | 264/DIG. 5 |
| 3,940,467 | 2/1976 | Brachman ........................... | 264/45.5 |
| 4,103,353 | 7/1978 | Dougherty ............................ | 366/81 |

FOREIGN PATENT DOCUMENTS 47-2038   1/1972   Japan ......................................... 366/81

OTHER PUBLICATIONS

Hansen, Ralph H. and William M. Martin "Novel Methods for the Production of Foamed Polymers," in I & EC Product Research and Development, vol. 3, No. 2, Jun. 1964, pp. 137–141.

Chung, Chan I.; R. J. Nichols and G. A. Kruder "Screw Horsepower Dependence on Screw Speed and Size-Theory and Experiment, " in Polymer Engineering and Science, vol. 14, No. 1, Jan., 1974, pp. 28–37.

McKelvey, James M. "Polymer Processing," New York, John Wiley and Sons, © 1962, pp. 277–297.

"Encyclopedia of Polymer Science and Technology," vol. 8, New York, John Wiley and Sons, © 1968, pp. 554–559.

Rubin, Irvin I. "Injection Molding Theory and Practice," New York, John Wiley and Sons (Wiley–Interscience), © 1972, pp. 27–45; 233–240.

Van Krevelen; D. W. and collaboration of P. J. Hoftyzer, "Properties of Polymers Correlations With Chemical Structure," New York, Elsevier, 1972, pp. 3–8; 20–25.

"Chemical Engineer's Handbook," Fifth Edition, prepared under editorial direction of Robert H. Perry and Cecil H. Chilton, New York, McGraw-Hill, © 1973, pp. 6–54; 6–55; 21–24 through 21–26.

Brydson, J. A. "Plastics Materials," Princeton, N. J., D. Van Nostrand, © 1966, pp. 33–37.

Primary Examiner—Philip Anderson
Attorney, Agent, or Firm—Alan Swabey; Robert Mitchell; Guy Houle

[57] ABSTRACT

A method and apparatus are provided for the extrusion of a thermoplastic material in modified form in which the thermoplastic material is introduced into the barrel of a screw extruder, and is heated and forced through the barrel: the material is passed through valve means which together with the temperature of the material is effective to produce a melt transition in the material at a predetermined point and to thoroughly mix the material; subsequently, the material is forced into a low pressure zone in the barrel where a modifying agent is introduced into the material; the resultant mass is forced out of the low pressure zone, and is passed through a mixing means effective to intensify the dispersion of the modifying agent in the mass, the mass is extruded and the extruded material collected.

11 Claims, 4 Drawing Figures

PROCESS FOR EXTRUSION COATING OF A WIRE WITH A CELLULAR THERMOPLASTIC RESIN MATERIAL

CROSS-REFERENCE TO RELATED APPLICATION

This application is a continuation-in-part of U.S. patent application Ser. No. 431,495, filed Jan. 7, 1974, now abandoned.

BACKGROUND OF THE INVENTION (a) Field of the Invention

This invention relates to a process for producing an extruded thermoplastic polymer material in modified form.

In one particular aspect the invention relates to a process for the production of extruded insulating coatings in cellular or cross-linked form for wire and cable.

(b) Description of Prior Art

In the production of wire and cable having an insulating coating, a thermoplastic material is extruded through a screw extruder and around a wire or cable passing through a die in the head of the screw extrusion apparatus. In accordance with the properties required in the coated wire or cable, the thermoplastic material is suitably modified.

For example, if a cellular effect is desired in the insulating coating, then a gaseous material may be incorporated in the thermoplastic material in the screw extruder barrel. The gaseous material may be formed in the thermoplastic material by the introduction of a solid blowing agent which is thermally decomposed to produce bubbles of gas, which provide the cellular effect; alternatively a gaseous material may be introduced directly into the thermoplastic material. In the latter case the introduction of an inert particulate material, for example, clay or metals is also desirable; to provide nucleation sites for the formation of the gas bubbles; if no nucleation sites are provided for the gaseous material there is a tendency for the gaseous material to form a solid solution with the thermoplastic material and no cellular effect is produced or at best the extruded material contains only random cells and lacks uniformity.

These methods have certain disadvantages in that the non-gaseous decomposition products produced in the thermal decomposition of the blowing agent and the properties of the inert particulate material can adversely effect the electrical properties of the coated cable.

For example, a commonly used blowing agent for the production of cellular thermoplastic material is azodicarbonamide, which, in the commercial form, or in the presence of commonly used additives, when thermally decomposed produces water, which if retained in the thermoplastic material will affect the electrical properties of the wire or cable coated with the material.

In most domestic articles the presence of water in the extruded cellular product would be of no significance, however, in the communication cable industry the presence of water in the extruded cellular insulating coatings of the cable conductors represents a serious problem.

The most commonly employed thermally decomposable blowing agent for the production of cellular insulated coatings in the communication cable industry is azodicarbonamide; the azodicarbonamide used by the communication cable industry includes a hydrated silica additive as a plating out agent; this hydrated silica produces water on heating which reacts with isocyanic acid produced in the thermal decomposition of the azodicarbonamide to prevent formation of cyanuric acid and cyamelide which would otherwise build up on the screw and die surface in the form of a white powder or pasty substance and interfere with the satisfactory operation of the extrusion, as well as acting as contaminants which affect the electrical properties of the cellular insulation.

However the production of water also results in the presence of residual water in the cellular insulating coatings produced.

Water is also evolved directly by the thermal decomposition of other blowing agents such as p,p'-oxybis(-benzene sulfonylhydrazide).

As discussed above in most fields of technology the amount of moisture produced in thermal decomposition of the commercially available particulate blowing agent would be considered insignificant even if the user was aware of it and in any event would be too small to produce any deleterious effect. This is not the case, however, in the sophisticated field of communication cable technology.

In any communication cable used at the higher frequencies (10 megahertz) which are frequencies for the video or television range, loss of signal becomes the important characteristic and even with the best manufactured communication cables there is a signal loss with distance (attenuation). This signal loss increases with frequency resulting in the need to introduce repeators (amplifiers). The attenuation is in part dependent on the dissipation factor and the SIC (Specific Inductor Capacitance) of the insulator in the transmission line. For example, a properly expanded cellular insulator which has not been put through a drying cycle, and which thus contains residual moisture, will have a dissipation factor of as high as 0.0006; after vacuum drying to remove the moisture, however, the dissipation factor will drop to 0.00015 and the attenuation of the line will drop accordingly.

The normal manufacture of CATV cables for the North American market invariably involves a prolonged drying cycle to remove residual moisture in the cellular insulation; this drying cycle is performed in an oven of low relative humidity (about 5%) at 150° C. or in a vacuum bell at 150° C., prior to application of the outer conductor and sheath of the cable. This moisture must be removed before applying the outer conductor, since otherwise the outer conductor will hermetically seal the moisture in after which it would be impossible to remove more moisture from the cable.

In conventional practice reels of the cables which may contain 15 to 20 layers on a reel are dried in ovens or vacuum bells as described for periods of the order of 48 hours.

Clearly, therefore, if the presence of residual moisture can be avoided or significantly reduced, the prolonged drying cycle can be eliminated, thereby resulting in considerable economy both in time and money.

Similarly the presence of inert particles of clay or metals as nucleation sites in the thermoplastic material will affect the electrical properties, for example, the capacitance of a wire or cable coated with the material.

In one aspect the present invention seeks to overcome these problems by providing a method for producing an extruded cellular thermoplastic insulating coating on a communication cable conductor wire wherein a small amount of a heat decomposable material is used to provide nucleation sites for a gaseous material and the use of non-heat decomposable particulate materials such as clay and metals as nucleation sites can be avoided; in this case the residual non-gaseous thermal decomposition products formed from the decomposition of the small amount of heat decomposable material are at a minimum, and so any adverse effect is also minimized and the drying cycle can be reduced or minimized.

It is also conventional practice to modify thermoplastic polymer material by the incorporation of a cross-linking agent in the thermoplastic material, particularly in the power cable industry. The cross-linking agent is incorporated in the thermoplastic polymer material prior to the introduction of the material into the screw extruder. Generally, the supplier of the thermoplastic material incorporates the cross-linking agent in the material so that it will set when heated to an elevated temperature. This has inherent disadvantages in that the customer has no control over the content of cross-linking agent in the thermoplastic material supplied and individual batches from the supplier vary with consequent variation in the electrical properties of the coated wire or cable. Also, cross-linking agents are often extremely unstable and some cross-linking inevitably occurs during storage of the thermoplastic material containing the cross-linking agent and this makes the production of a homogeneous mixture more difficult during extrusion in the screw extruder.

In the conventional procedure the supplier of the polymer incorporates the cross-linking agent into the polymer while it is in a molten state and thoroughly mixes the molten polymer with the cross-linking agent under carefully controlled conditions in an attempt to minimize any cross-linking. After the mixing is complete the molten polymer containing the cross-linking agent is cooled and stored ready for shipment to the cable manufacturer.

This somewhat unsatisfactory procedure arises from the difficulty in handling molten polymers with cross-linking agents without prematurely initiating the cross-linking. The normal shearing action which occurs in a screw extruder is not adequate to produce thorough mixing of the cross-linking agent and attempts to improve the mixing by increasing the temperature of the molten polymer to lower its viscosity result in premature cross-linking which in turn results in blockages in the screw extruder, necessitating dismantling of the extruder for cleaning to remove cross-linked material.

The mixing means employed on the screw in the method of the present invention, however, overcome this difficulty and produce thorough mixing without premature cross-linking in the screw extruder.

In one aspect of the present invention there is provided an improved method for producing a cross-linked polymeric extruded insulating coating in which the user is able to control the content of cross-linking agent directly.

It is an object of this invention to provide an improved method for producing cellularly insulated wires, particularly conductor wires for communication cables.

It is a further object of this invention to provide an improved method for producing a cross-linked insulating coating on a wire, particularly a conductor wire for a power cable.

It is a further object of this invention to provide a novel process using a screw extrusion apparatus having a novel valve means and mixing means.

SUMMARY OF THE INVENTION

According to the invention there is provided a method of preparing a cable conductor wire insulated with a cellular thermoplastic electrically insulating material in extruded form comprising: introducing a solid thermoplastic electrically insulating polymer material and a small amount of a discrete particulate material effective to provide nucleation sites into a screw extruder barrel, containing a screw mounted for rotation, to form a mixture, said screw being effective to advance and shear said mixture, passing the mixture through the screw extruder barrel, heating and shearing said mixture in a first portion of said barrel to melt the polymer material, passing the molten mixture through a combined valve and mixing means which together with the heating and shearing of the mixture is effective to produce the melting of the polymer material from the solid state to a molten state and to disperse the nucleation sites in the molten mixture, forcing said molten mixture into a low pressure zone in the barrel and maintaining said shearing, introducing a gaseous material into said molten mixture in the low pressure zone, and allowing the gaseous material to be nucleated in the molten mixture at nucleation sites provided by said particulate material, forcing the resultant mass out of the low pressure zone, and into a zone of higher pressure and passing the mass through an intense mixing means effective to disperse the nucleated gaseous material said mixing means comprising at least three spaced apart mixing elements disposed radially to said screw, each of said elements comprising at least a pair of adjacent rows of radially disposed lugs, the lugs of each row of a mixing element being in a staggered relationship with the lugs of the adjacent row, forcing said mixture through an extrusion head and about a moving conductor wire in a compressed form and allowing the thus obtained extruded mixture to expand, collecting the conductor wire insulated with cellular thermoplastic extruded insulating material; said valve means comprising at least two closely spaced apart rows of radially disposed lugs mounted normal to and circumferentially around the screw to form a ring, the lugs of one of said rows being in staggered relationship with the lugs of the other of said rows.

According to another aspect of the invention there is provided a method of producing an electric cable conductor wire insulated with a cross-linked polyolefin insulating material in extruded form comprising: introducing a polyolefin into a barrel of a screw extruder, containing a screw mounted for rotation, said screw being effective to advance and shear said polyolefin, forcing the polyolefin through the screw extruder barrel, heating and shearing said polyolefin in a first portion of said barrel to produce a transistion in the polyolefin from the solid state to a molten state, forcing the polyolefin into a low pressure zone in the barrel and maintaining said shearing, introducing a cross-linking agent as a dispersion in a low viscosity fluid into the polyolefin in the low pressure zone to form a mixture, forcing the resultant mass out of the low pressure zone and into a zone of higher pressure and passing the mass through an intense mixing means, said mixing means comprising at least three spaced apart mixing elements disposed radially to said screw, each of said elements comprising at least a pair of adjacent rows of radially disposed lugs, the lugs of each row of a mixing element being in a staggered relationship with the lugs of the adjacent row, forcing the mixture through an extrusion head and about a moving conductor wire and allowing the polyolefin to cross-link, collecting the conductor wire insulated with extruded cross-linked polyolefin.

According to a still further aspect of the invention there is provided the utilization of a screw extrusion apparatus for working and modifying polymer material, which apparatus comprises a barrel leading from a feed port to a discharge; means for heating polymer material during passage through said barrel; a continuous feed screw provided with a core and helical thread rotatable in said barrel, said core having upstream and downstream portions interconnected by an intermediate portion of lesser diameter forming a low pressure extrusion zone; an intermediate passage for introducing a modifying substance into said zone; material mixing means in said downstream portion; and a combined valve and mixing means on said upstream portion; said combined means comprising at least two closely spaced apart rows of radially disposed lugs mounted normal to and circumferentially around the screws to form a ring, the lugs of one of said rows being in staggered relationship with the lugs of the other of said rows; and said mixing means comprising at least three spaced apart mixing elements disposed radially to said screw, each of said elements comprising at least a pair of adjacent rows of radially disposed lugs, the lugs of one row of a mixing element being in a staggered relationship with the lugs of the other of said rows.

DESCRIPTION OF THE PREFERRED EMBODIMENTS (i) Cellular Extrusion

This embodiment of the invention provides for the production of cellular insulating coatings on conductor wires, particularly those intended as a component of a communication cable.

By employing the method of the invention cellularly insulated conductor wires for communication cables can be passed directly from a wire covering crosshead die at the extruder to the assembly stage of a communication cable, without the necessity of a prolonged drying operation to remove moisture, thereby speeding up the total assembly line for communication cable manufacture.

Typical thermoplastic polymers which may be employed for the manufacture of cellular coatings include polymers or mixtures of polymers obtained by the polymerization or copolymerization of aliphatic olefins, for example, ethylene, propylene and butene; halogenated aliphatic olefins, for example vinyl chloride. In the manufacture of cellularly insulated conductor wires for communication cables, polyethylene and polypropylene are especially preferred. Particularly useful copolymers include copolymers of ethylene and butene and copolymers of propylene and ethylene.

Suitable gaseous materials include nitrogen, argon, helium, air, carbon dioxide, pentane, fluorinated lower hydrocarbons and lower hydrocarbons which are both fluorinated and chlorinated, typical of the fluorinated and chlorinated compounds are those available under the trademark "FREON", for example, trichlorofluoromethane, dichlorodifluoromethane, chlorotrifluoromethane, chlorodifluoromethane 1,2,2-trichloro, 1,2,2-trifluoromethane, and symdichlorotetrafluoroethane.

Suitable blowing agents include azodicarbonamide, 2,4'-oxybis(benzenesulphonylhydrazide), N-aminophthalamide and N,N'-dinitropentamethylenetetramine, with azodicarbonamide being preferred. These blowing agents decompose to produce gas bubbles which provide nucleation sites for the gaseous material. Further some of the blowing agents produce water on thermal decomposition. In the manufacture of cellular insulation coatings for communication cable conductor wires such blowing agents contain an anti-plating agent which is usually a hydrated silica which on heating evolves water. Thus water is evolved from the blowing agent additive during the heating in the extruder even though the water is not necessarily produced by thermal decomposition of the blowing agent. The production of water in this way is intentional to hydrolyse non-gaseous by-products of the thermal decomposition of the blowing agent.

The method of the invention while employing the conventional blowing agent additive minimizes the amount employed thereby minimizing residual moisture in the cellular insulation to an acceptable level.

The silica produced from the hydrated silica assists in the formation of nucleation sites, by providing points of high heat content for gas nucleation; however, its presence for this purpose is not essential to this invention.

Suitably the blowing agent additive is employed in an amount of 0.1 to 0.2% and preferably about 0.15%, by weight, based on the weight of thermoplastic material.

(ii) Cross-linked Extrusion

This embodiment of the invention provides for the production of cross-linked insulating coatings on conductor wires, particularly those intended as a component of a power cable.

The method of the invention permits the manufacturer of the power cable to introduce the cross-linking agent directly into the molten cross-linkable polymer material in the screw extruder and to obtain thorough mixing of the cross-linking agent with the polymer immediately prior to the cross-linking step.

This enables the cable manufacturer to control the amount of cross-linking agent, and reduces to a minimum the time which the cross-linking agent is in the polymer prior to the cross-linking step, thereby avoiding the possibility of premature cross-linking.

Suitable polymers include any of the conventional polymers which can be cross-linked; polyolefins, for example, polyethylene and polypropylene are particularly preferred, with low density polyethylene being especially preferred.

Suitable cross-linking agents are the peroxides, for example, dicumyl peroxide, dibenzoyl peroxide, t-butyl perbenzoate 2,5-bis(ter-butylperoxy)-2,5-dimethylhexane and 2,5-dimethyl-2,5-di(t-butylperoxy).

The cross-linking agents are conveniently introduced as a dispersion in a low viscosity fluid, typically in the form of a lower viscosity paste.

A suitable paste may be produced by intensely mixing a peroxide cross-linking agent, for example, dicumyl peroxide with a low molecular weight polybutene in an ink mill or similar three roll mill, using a heated pre-mixed mixture of the polybutene and the dicumyl peroxide. The paste may be introduced continuously into the extruder barrel by a balloon pump although other means of introduction will be readily apparent.

The amount of cross-linking agent added is suitably of the order of about 1% to about 3% preferably about 2%, by weight, based on the weight of polymer.

(iii) Screw Extruder

The screw extruder of the invention includes both a combined valve and mixing means, hereinafter simply referred to, for convenience, as "valve means" in an upstream portion of the screw and a mixing means in a downstream portion.

It has been found that in a screw extruder the conversion of a solid polymer to a polymer melt must occur or at least be initiated within that upstream region of the barrel containing the first five turns of the helical flight from the feed end. Generally if the conversion of the solid polymer to the polymer melt does not occur in this region it becomes impossible to advance the polymer through the screw extruder.

This factor is taken account of in determining the form and location of the valve means and mixing means, but especially the latter.

Considering the mixing means this comprises at least three spaced apart mixing elements disposed radially to the screw, each of which elements comprises at least a pair of adjacent rows of radially disposed lugs, the lugs of each row of a mixing element being in a staggered relationship with the lugs of the adjacent row so as to provide a tortuous path for the polymer serving to divide the molten material into streams which re-unite after passing each element, thereby producing an intensive mixing.

The lugs extend radially outwardly from the screw so that only a narrow clearance is provided between the ends of the lugs and the inner surface of the barrel.

Each row of lugs is suitably a row of pins the ends of which have a profile which is convexly curved to match the concave curvature of the inner surface of the barrel. Pins of this form have been found to be superior to pins having squared ends. Each row may similarly be composed of a toothed ring, but again toothed rings in which the teeth have rectangular ends are found to be less satisfactory than pins with rounded ends. It is believed that the narrow clearance between the pins with rounded ends and the inner surface of the barrel assists in forcing the polymer to take the tortuous path provided between the staggered pins.

A conventional screw has a length to diameter ratio (L/D ratio) of 24:1. For this screw it is found that the mixing means should desirably consist of only 3 or 4 spaced apart mixing elements each of which comprises 2 or 3 spaced apart rows of the staggered pins. If there are four spaced apart elements then there are preferably only two spaced apart rows in each element.

Optimum results are obtained with three mixing elements each comprising two rows of pins in staggered relationship. If less than three mixing elements are employed then the mixing obtained is inadequate, if more than four mixing elements are employed in this screw then undesirably high temperatures are generated by the very intense mixing. Further as the number of mixing elements is increased the point at which the solid polymer is converted by melting to a polymer melt moves downstream in the extruder, with the result that it may not take place within the region of the first five turns of the helical flight.

However, if the screw extruder is lengthened then additional mixing elements may be added although they may be unnecessary to obtain adequate mixing. Generally it is found that one additional mixing element comprising a double or a triple row of pins can be added for each additional 4 L/D of screw extruder. In other words if the L/D ratio of the screw is increased from 24:1 to 28:1, then one additional mixing element can be accommodated. If the L/D is increased to 32:1 then two additional mixing elements can be accommodated.

The valve means comprise at least two closely spaced apart rows of lugs mounted normal to and circumferentially around the screw to form a ring, the lugs of one of the rows being in a staggered relationship with the lugs of the adjacent row. The closely spaced rows and the staggered relationship of the lugs provide a tortuous path for the polymer. The valve means produces a back pressure which produces an additional mixing effect supplementing the mixing action provided by the lugs which divide the polymer into narrow streams which re-unite.

The lugs of the valve means are preferably pins of the same form as the pins of the preferred mixing elements. Preferably the valve means comprises only 2 or 3 rows of the pins.

In the embodiment of the invention relating to cellular extrusion the valve means provides an intense mixing of the polymer melt and nucleation sites prior to the introduction of the polymer into the low pressure zone, where the gaseous material to be nucleated is introduced. This serves to distribute the nucleation sites through the polymer melt.

The valve means has a further function in that it effectively seals off the upstream portion of the screw extruder to escape of gaseous material introduced into the low pressure zone, where the gaseous material might either escape from the feed end of the extruder or enter into a solid solution. The valve means forms an obstacle to the passage of the polymer melt through the screw extruder and produces a back pressure which itself produces a mixing effect and a high pressure zone which effectively prevents the escape of the gaseous material.

A further feature of the valve means is that it is a determining factor in the position in the screw extruder where the polymer melts; it is not the only factor, however, and the temperature of the material and the mixing means in the downstream portion of the screw are also factors. Nevertheless the preselection of the kind and location of the valve means is decisive in predetermining the position of formation of the polymer melt. This is highly significant because, as has already been described, it appears to be critical to produce the polymer melt close to the feed end of the screw for successful continuous operation.

The valve means is not essential in the embodiment of the invention relating to cross-linking, nevertheless it is a highly desirable feature of this aspect, in view of its ability to determine the position of the polymer melt formation. Further when the polymer contains additives, for example, pigments, the intense mixing produced by the valve means assists in thoroughly dispersing these.

The screw of the screw extruder has a helical flight which is substantially continuous from the feed end to the die end. The flight is however interrupted at the locations where the pins of the valve means and mixing means are located; these locations where the flight is interrupted are thus very short in length being just sufficient to permit mounting of the pins so that a complete ring of pins is formed. Thus there are no flightless portions of the screw.

BRIEF DESCRIPTION OF DRAWINGS

A preferred embodiment of the invention is illustrated with reference to the accompanying drawings, in which.

DESCRIPTION OF THE PREFERRED EMBODIMENTS WITH REFERENCE TO THE DRAWINGS

Figures 1, 2, 3, 4:
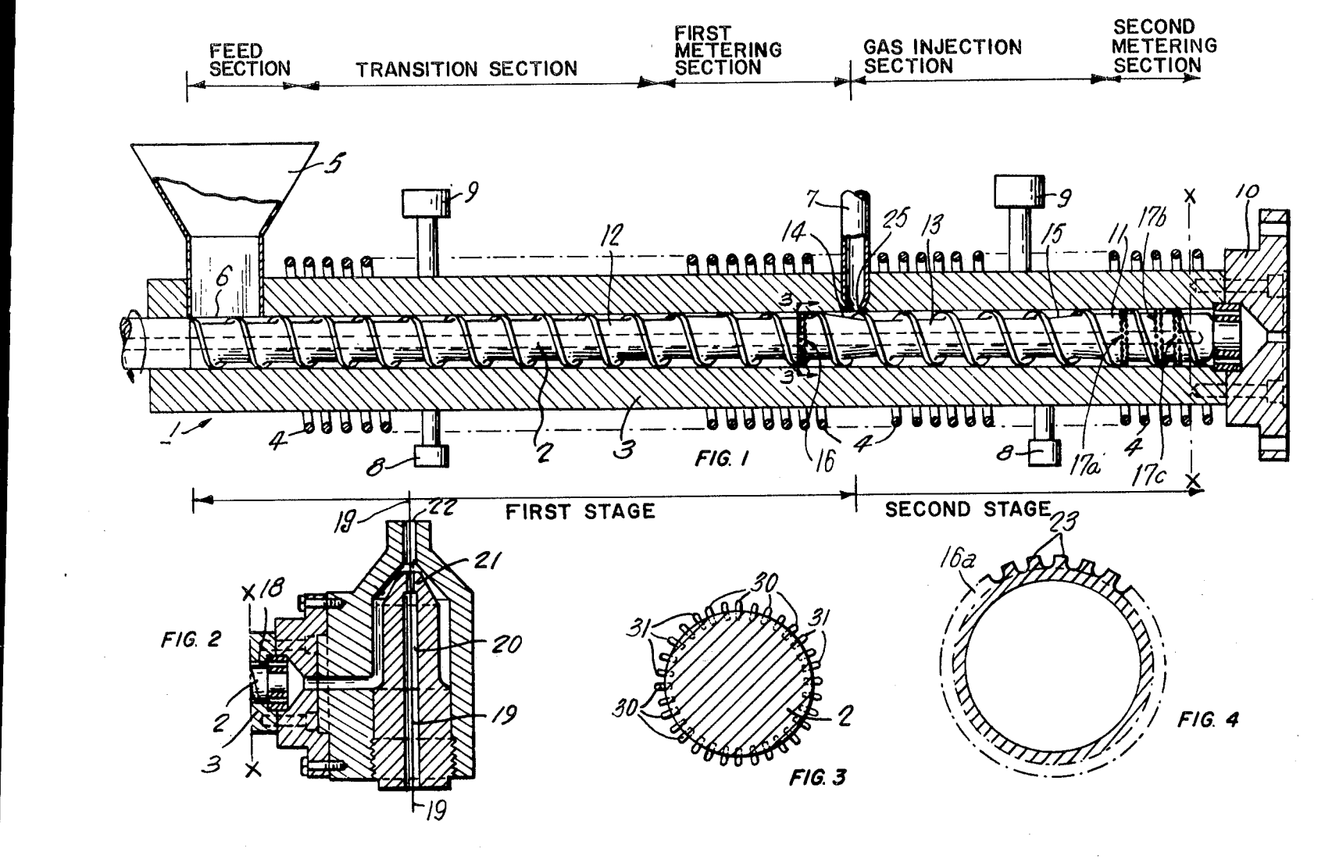
FIG. 1 is a cross-sectional view of an extruder.
FIG. 2 is a cross-sectional view of a wire covering crosshead die used in extruding coatings about a wire conductor.
FIG. 3 is a cross-section on a line 3—3 of FIG. 1
FIG. 4 illustrates a toothed ring suitable as the valve means.

With reference to FIG. 1 an extruder 1 has a multi-zone two-stage feed screw 2 rotatably mounted in a barrel 3 heated by means of electrical resistance heaters 4.

The barrel 3 of the extruder is fitted with a feed hopper 5 having a feed port 6 situated at the base thereof, an inlet passage 7 having a nozzle 25 for the introduction of a modifying agent into the barrel 3, thermocouples 8, pressure gauges 9 and a die 10.

The feed screw 2 comprises a downstream portion 11 and an upstream portion 12 intervened by an intermediate portion 13 of lesser diameter and by tapered portions 14 and 15.

The zone in the barrel 3 occupied by the intermediate portion 13 constitutes, due to the smaller diameter of intermediate portion 13, a low pressure zone in the barrel 3 relative to the zones on each side of the intermediate portion 13.

A valve 16 comprising two rows of pins and a mixing element 17 comprising mixing rings 17a, 17b, 17c each of which comprises two rows of pins; the rows of pins in valve 16 and mixing element 17 are located circumferentially around the screw 2, the pins of one row of a pair being staggered relative to the pins of the other row of the pair, and are mounted in spaced apart relationship on the feed screw 2, the valve 16 being mounted on the portion 12 and the rings 17a, 17b and 17c being mounted on the portion 11.

In the operation of the process for modifying a thermoplastic material, a thermoplastic polymer is fed into the extruder 1 via the hopper 5 and feed port 6. The screw 2 driven by suitable drive means (not shown) advances the thermoplastic polymer through barrel 3, which is heated by heaters 4. The thermoplastic polymer is thereby forced into intimate and substantially sliding contact with the hot walls of barrel 3, and is also sheared and worked whereby frictional effects are produced.

The thermoplastic material is forced through barrel 3, and a conversion or melt transition is produced in it, from a solid particulate state to a fluid or molten state i.e. a polymer melt, by the combined effect of the valve 16, the temperature of the material and to a lesser extent the mixing element 17. It has been found that the position of the melt transition can be predetermined to a large extent by preselection of the form and location of valve 16 and of the temperature maintained in the barrel 3; and that the position is not affected by the dimensions of the die 10, as is believed to be the case when no valve 16 is used.

The ability to select the point of polymer melt formation clearly has a number of advantages. For example, where modifying substances are to be added to the material, the state of the material can be appropriately selected at a given point relative to the introduction of the modifying material for a more efficient operation.

The material is subjected to shearing forces to produce mixing and a back pressure produced by the valve 16. This back pressure produces an additional mixing effect, which is supplemented by the mixing action of the pins of the valve 16, which serve to divide the molten thermoplastic material into streams, which reunite after passing the valve 16. The valve 16 produce a thorough mixing of the thermoplastic material before it proceeds into the low pressure zone around intermediate portion 13, where the modifying agent is introduced into the thermoplastic material via nozzle 25 of inlet passage 7.

The thermoplastic material and modifying agent proceed out of the low pressure zone, and are subjected to a mixing action by the mixing rings 17a, 17b and 17c, which serve to intensify the dispersion of the modifying agent in the thermoplastic material.

In the case in which the modifying agent is a gaseous material and a cellular or foamed structure is to be formed a small amount, for example 0.1% of a discrete particulate preferably heat decomposable gas producing material as for example azodicarbonamide is introduced into the thermoplastic polymer via hopper 5. This material decomposes in the barrel 3 around the upstream portion 12 to produce small gas bubbles, which will act as nucleation sites for the gaseous material introduced in the low pressure zone. Other materials in particulate form, for example, clay and metal can also be used to provide nucleation sites, however, these are less preferred since they remain in the extruded material and consequently may affect the electrical properties. Since only a small amount of a heat decomposable material is used, residual amounts of non-gaseous thermal decomposition products are at a minimum.

The valve 16 provides a thorough mixing and consequently a uniform distribution of the nucleation centres in the thermoplastic material as well as aiding the melt transition as described above. The mixing rings 17a, 17b and 17c intensify the dispersion of the gaseous material introduced via inlet 7 to maintain the uniform distribution of gas bubbles in the thermoplastic material.

The valve 16 is also effective in preventing loss of the gasous material introduced via inlet 7 through the feed end of the barrel 3.

The amount of gaseous material introduced into a particular polymer for a specific wall thickness and for a specific end use of the product will in practice vary by volume from about 40% of dielectric volume to 70% of dielectric volume for olefin polymers and as much as 90% for styrene polymers. For example, in an insulated conductor in which the starting olefin polymer has a density of 0.93 (units) the density is reduced by the addition of gaseous material, for example, nitrogen, to a figure which will indicate the above-mentioned percentages of gas.

Since in many instances there is a desired capacitance effect as well as a desired thickness of insulation for a particular wire or conductor, the amount of gas introduced is that which will produce the desired parameters and consequently may be less than the total amount of gas which it is possible to introduce.

Gas is introduced continuously through passage 7 at a rate that will satisfy the parameters of the desired end product and which will allow a pressure of introduction sufficient to overcome the pressure in the barrel 3 attempting to obstruct the gas. Specific nozzle sizes for the passage 7 and specific pressures are required for a wide variety of end products, however, these parameters are readily determinable, generally it has been found that an air driven pump having a compression ratio of 20:1 is suitable.

Also, it would appear that the introduction of the gaseous material through a single nozzle 25 in passage 7 of small size is significant and, particularly for the insulation of telephone cables, a single nozzle 25 having a hole diameter of about 0.002 inches has produced satisfactory results where the pressure in the low pressure zone around intermediate portion 13 of screw 2 is of the order of 2000 to 4000 psi. In this case, it is necessary to use a pump to introduce the gaseous material with a uniform output to overcome the pressure. Therefore, the amount of gaseous material passing through the nozzle 25 is a function of both the pump pressure and the hole size.

A significant advantage of the process of the present invention using the extruder 1 is that it has been found possible to achieve good control of the capacitance of the insulated wire to a permissible deviation of plus or minus 0.5 picofarads/foot.

In the case in which a cellular insulation is produced by the introduction of a gaseous material the coated material is quenched in a water bath to limit expansion of the gas; the water bath is moved automatically to change the position of the water quenching interface upon instruction or signal from a capacitance monitor through an amplifier or servo and the final capacitance is monitored in this way. However, the final capacitance is dependent on several factors including the composition and uniformity of the insulating material. The present invention in providing a coating material of uniform composition and consistency thus greatly assists in the control of capacitance of the insulated wire.

The material is extruded through the die 10, and the gas bubbles expand to produce the cellular structure.

In the case in which the modifying agent is a cross-linking agent, the rings 17a, 17b and 17c ensure a thorough distribution of the cross-linking agent in the thermoplastic polymer; this is desirable in order to ensure a product of uniform composition and properties. Cross-linking not only produces a heat settable product, which can thus be used at high temperatures at which the non-cross-linked polymer would melt, but also for certain polymers, for example polyethylene, the tensile strength and resistance to stress cracking are increased.

The cross-linking agent is suitably added as a low viscosity paste comprising the cross-linking agent in a liquid vehicle. In one embodiment a suitable paste comprising dicumyl peroxide in a low molecular weight polybutene was made in an ink mill using a heated pre-mixed solution of low molecular weight polybutene and dicumyl peroxide. The paste may be introduced continuously into the extruder barrel by a balloon pump.

The process and apparatus according to the invention are particularly suitable for the extrusion of a coating around a conducting wire in the manufacture of electrical cables, particularly communication cables and power cables.

FIG. 2 is a cross-sectional view of a typical wire covering crosshead employed in the manufacture of electrical cables. With reference to FIG. 2, a crosshead 24 comprises a breaker plate assembly 18, a conducting wire 19, a guide passage 20 for the wire 19, a guide mandrel 21, and an orifice 22.

With further reference to FIG. 3, a plurality of pins 30 and 31 are mounted in the screw 2, the exposed ends of the pins being convexly curved, the pins 30 and 31 forming two rows respectively the pins 30 being in staggered relationship with the pins 31 so that each pin 30 is located exactly opposite the space between two pins 31 and vice versa.

The pins of rings 17a, 17b and 17c are of similar form to those of pins 30 and 31 of valve 16.

With reference to FIG. 4, a detail of a mixing ring 16a of a valve 16 having teeth 23 rather than a plurality of pins is shown.

The valve 16 is located in the screw 2 such that the pins 30 in one ring of the valve 16 fall exactly between the spaces between the pins 31 in the other ring of the valve 16 (see FIG. 3); and the rings of the valve 16 are spaced such that material passing between the rings of the valve 16 has to travel along a tortuous path for example 1/16 inches wide between each pin 30 in the first row of pins and corresponding pin 31 in the second row of pins.

The clearance between the upper end of pins 30 and 31 and the wall of the barrel 3 is about 0.008 inches to about 0.06 inches and may be the same as between the screw flights and the barrel.

In the embodiment illustrated in FIG. 1 the valve 16 and mixing rings 17a, 17b and 17c each comprise a pair of rows of pins spaced circumferentially around the screw 2.

The locations and spacings of valve 16 and rings 17a, 17b and 17c relative to the tip of the screw 2 at the downstream extension end in a particular embodiment, for a screw 2 of the dimension given in Table I below, are given in Table II below. In this specific embodiment detailed in Table I, upstream portion 12 comprises three zones namely the first, second and third zones of the screw. The first zone is the feed section; the second zone is a tapered transition section; the third zone is a first metering section. The dimensions given are by way of illustration only, and it will be readily apparent that other dimensions could be used which could be readily determined by experiment.

TABLE I

| | inches |
|---|---|
| Length of screw overall | 76.375 |
| length of downstream portion 11 | 20 |
| length of intermediate portion 13 | 2.5 |
| length of upstream portion 12 | 39.25 |
| first zone of portion 12 | 7 |
| second zone of portion 12 | 22.25 |
| third zone of portion 12 | 10 |
| axial length of tapered portion 15 | 2.5 |
| axial length of tapered portion 14 | 1.25 |
| outside diameter of screw 2 | 2.5 constant |
| depth of thread at downstream portion 11 | 0.15 nominal |
| depth of thread at intermediate portion 13 | 0.300 nominal |
| depth of thread at upstream portion 12 | |
| first zone of portion 12 | 0.330 nominal |
| second zone of portion 12 | tapered |
| third zone of portion 12 | 0.110 nominal |

The overall diameter of the screw 2 is constant throughout (from thread tip to tip), and the diameter of the core of the screw 2 varies according to the depth of the thread.

In the exemplified embodiment tapered portion 14 constitutes a fourth zone of the screw; intermediate portion 13 constitutes a fifth zone being the vent section; tapered portion 15 constitutes a sixth zone; and downstream portion 11 is the seventh zone being a second metering section.

TABLE II

| Rings | $d_1$ inches | $d_2$ inches | $d_3$ inches |
|---|---|---|---|
| 16  | 0.118–.005  | 0.030 | 26.5 |
| 17a | 0.2162–.003 | 0.120 | 17.5 |
| 17b | 0.1447–.005 | 0.060 | 11.25 |
| 17c | 0.118–.005  | 0.030 | 5 |

$d_1$ is the distance of separation between the adjacent rows of pins,
$d_2$ is the distance between a pin in one row and the closest pin in the other row,
$d_3$ is the distance of the rings from the die end of the screw 2 at the downstream end.

In operation the material in the barrel 3 is forced through the breaker plate 18 and passes to the guide mandrel 21, which is shaped so that the material flows around either side of it, thereby forming a flowing annulus around the mandrel 21, which flows towards the orifice 22 and ultimately contacts the wire. In this manner, a coating is deposited over the wire 19, which moves continuously through the crosshead and acts as an internal forming mandrel. In order to ameliorate the adhesion of the coating to the wire 19 it is found in certain cases to be advantageous to heat the wire 19 which heating can be achieved by passing an electric current through the wire; generally it is desirable to heat wire 19 to a surface temperature of about 200° F. and to maintain this temperature with respect to wire throughput.

Thus in producing a coated wire for an electrical cable the extruded polymer emerges from the die 10 and passes around the mandrel 21 and onto a conducting wire 19 which passes continuously through passage 20. The coated wire emerges through orifice 22.

In the embodiment in which a cellular coating is being formed the high compressed gas bubbles in the thermoplastic polymer expand as the coated wire emerges from orifice 22, to produce the cellular effect. The degree of expansion is carefully controlled by cooling, as with a moving water trough; the expansion can thus be controlled to provide substantially uniform capacitance along the coated conductor wire.

In the embodiment in which a cross-linked coating is being formed a tube containing high pressure steam is mounted on the crosshead 24 adjacent orifice 22 to effect the cross-linking with the cross-linking agent. The steam may suitably be at a temperature of 440° F. to 460° F.

It will be apparent to those skilled in the art that other modifying agents might be introduced in accordance with the invention depending on the modification of the thermoplastic required. Additives, for example fillers, antioxidants and pigments can also be added in accordance with the invention to modify the properties of the thermoplastic material particularly if a cross-linking agent is also to be added.

The following examples are illustrative of the processes according to the invention.

EXAMPLE 1

99.85 grams of polyethylene granules (low density), and 0.15 grams of azodicarbonamide were charged through hopper 5 into the barrel 3 of the extruder 1 having been preheated to a temperature ranging from about 18° to 55° C. in the vicinity of the hopper 5 to about 155° C. in the vicinity of inlet 7 to about 288° C. in the vicinity of the die 10. Nitrogen gas was introduced into the low pressure area under a pressure of about 2000 psi, and the mixture was extruded around a wire 19 preheated to a surface temperature of about 93° C. of approximately 0.020 inches in diameter to produce a cellular coating 0.025 inches in thickness.

EXAMPLE 2

The process according to Example 1 was repeated with the exception that the nitrogen gas was introduced into the low pressure area under a pressure of about 200 psi, and the mixture was extruded around a CATV wire (a trunk cable used for the distribution of wired television) 19 having a diameter of about 0.5 inches.

EXAMPLE 3

98.5 grams of polyethylene granules (low density) were charged through hopper 5, the barrel 3 of the extruder having been preheated to a temperature ranging from about 94° C. in the vicinity of hopper 5 to about 127° C. in the vicinity of inlet 7 to about 131° C. in the vicinity of die 10. 1.5 grams of dicumyl peroxide in the form of a paste in a low molecular weight polybutene were introduced into the low pressure zone via inlet 7 and the resultant mixture was extruded around a power cable 19 having a diameter of 0.0665 inches. The coated wire 19 emerges from orifice 22 and passes through a 200 foot high pressure tube containing saturated steam at a pressure of about 200 lbs/sq.in. in which the cross-linking takes place. The resulting wire had a coating of 0.032 inches in thickness.

I claim:

1. A method of preparing a cable conductor wire insulated with a cellular thermoplastic electrically insulating material in extruded form, said method comprising the steps of:
   providing a screw extruder of the type including a barrel having mounted therein for rotation a screw effective to advance and shear a mixture of solid particulate polymer material and a discrete particulate material;
   providing on the screw combined valve and mixing means effective to convert solid particulate polymer to a polymer melt and to disperse particulate material in the polymer melt wherein the combined valve and mixing means includes at least two closely spaced apart rows of radially disposed pins mounted normal to and circumferentially around the screw to form a ring and wherein the pins of one of the rows is in staggered relationship with the pins of the other of the rows;
   providing the screw with a low pressure zone downstream of the valve means followed by a high pressure zone;
   providing on the screw downstream of the high pressure zone intense mixing means effective to disperse nucleated gaseous material wherein the intense mixing means includes at least three spaced apart mixing rings disposed radially to the screw and each mixing ring including at least a pair of adjacent rows of radially disposed pins with the pins of each row of a mixing ring being in a staggered relationship with the pins of the adjacent row;
   providing an extrusion head for the extruder;
   passing a moving conductor wire through the extrusion head;
   introducing a mixture of a thermoplastic, electrically insulating, solid particulate polymer material, selected from the group consisting of polyethylene, polypropylene and polyvinylchloride, and a small amount of discrete particulate material effective to provide nucleation sites into the extruder barrel;

passing the mixture through the barrel, heating and shearing the mixture in a first upstream portion of the barrel;

advancing the mixture through the barrel towards the combined valve and mixing means and converting the solid particulate polymer to a polymer melt and dispersing the discrete particulate material in the polymer melt;

advancing the polymer melt through said combined valve and mixing means, whereby said melt is divided into streams between the staggered pins, allowing said streams to reunite on emerging from the combined means, whereby the nucleation sites provided by the particulate material are thoroughly distributed throughout said melt;

advancing the polymer melt into the low pressure zone downstream of the combined valve and mixing means while maintaining the shearing;

introducing a gaseous material into the polymer melt in the low pressure zone, and allowing the gaseous material to be nucleated in the polymer melt at the nucleation sites provided by the discrete particulate material;

forcing the resultant mass out of the low pressure zone and into the zone of higher pressure and passing the mass through the intense mixing means and dispersing the nucleated gaseous material in the mass;

forcing the mixture through the extrusion head and about the moving conductor wire in a compressed form and allowing the thus obtained extruded mixture to expand;

and then collecting the conductor wire insulated with the extruder cellular thermoplastic insulating material; said combined valve and mixing means being effective to seal off the upstream portion of the screw extruder to prevent escape thereto of the gaseous material introduced in said low pressure zone.

2. A method according to claim 1, wherein based on a screw having a L/D ratio of 24:1, the intense mixing means comprises 3 to 4 of the spaced apart mixing rings, each of the mixing rings comprising 2 to 3 of the adjacent rows of pins; and the combined valve and mixing means comprises 2 to 3 of the rows of pins.

3. A method according to claim 2, wherein said intense mixing means includes not more than one additional mixing element for each additional 4 L/D.

4. A method according to claim 3, wherein said pins of said combined valve and mixing means and of said intense mixing means comprise pins having an outer end profiled to match the internal contour of said barrel.

5. A method according to claim 1, for the production of a communication cable in which said particulate material is a thermally decomposable solid blowing agent additive which additive produces water, and said nucleation sites comprise gas bubbles formed by thermal decomposition of said blowing agent.

6. A method according to claim 5 wherein said blowing agent additive comprises azodicarbonamide and an antiplating agent.

7. A method according to claim 6 wherein said gaseous material is nitrogen.

8. A method according to claim 6 wherein said additive is present in an amount of about 0.15%, by weight, based on the weight of the thermoplastic polymer.

9. A method according to claim 8, wherein said antiplating agent is a hydrated silica.

10. A method of preparing a communication cable comprising a cable conductor wire insulated with a cellular thermoplastic electrically insulating material in extruded form, and an outer conductor and sheath around the wire, said method comprising the steps of:

providing a screw extruder of the type including a barrel having mounted therein for rotation a screw effective to advance and shear a mixture of solid particulate polymer material and a discrete particulate material;

providing on the screw combined valve and mixing means effective to convert solid particulate polymer to a polymer melt and to disperse particulate material in the polymer melt wherein the combined valve and mixing means includes at least two closely spaced apart rows of radially disposed lugs mounted normal to and circumferentially around the screw to form a ring and wherein the lugs of one of the rows is in staggered relationship with the lugs of the other of the rows;

providing the screw with a low pressure zone downstream of the combined valve and mixing means followed by a high pressure zone;

providing on the screw downstream of the high pressure zone intense mixing means effective to disperse nucleated gaseous material wherein the intense mixing means includes at least three spaced apart mixing rings disposed radially to the screw and each mixing ring including at least a pair of adjacent rows of radially disposed lugs with the lugs of each row of a mixing ring being in a staggered relationship with the lugs of the adjacent row;

providing an extrusion head for the extruder;

passing a moving conductor wire through the extrusion head;

introducing a mixture of a thermoplastic, electrically insulating, solid particulate polymer material, selected from the group consisting of polyethylene, polypropylene and polyvinylchloride, and a small amount of discrete particulate material effective to provide nucleation sites into the extruder barrel;

passing the mixture through the barrel, heating and shearing the mixture in a first upstream portion of the barrel;

advancing the mixture through the barrel towards the combined valve and mixing means and converting the solid particulate polymer to a polymer melt and dispersing the discrete particulate material in the polymer melt;

advancing the polymer melt through said combined valve and mixing means, whereby said melt is divided into streams between the staggered lugs, allowing said streams to reunite on emerging from the combined means, whereby the nucleation sites provided by the particulate material are thoroughly distributed throughout said melt;

advancing the polymer melt into the low pressure zone downstream of the combined valve and mixing means while maintaining the shearing;

introducing a gaseous material into the polymer melt in the low pressure zone, and allowing the gaseous material to be nucleated in the polymer melt at the nucleation sites provided by the discrete particulate material;

forcing the resultant mass out of the low pressure zone and into the zone of higher pressure and passing the mass through the intense mixing means and dispersing the nucleated gaseous material in the mass;

forcing the mixture through the extrusion head and about the moving conductor wire in a compressed form and allowing the thus obtained extruded mixture to expand;

and passing a plurality of the cellularly insulated conductor wires from the extruder head to a communication cable assembly stage and applying an outer conductor and sheath around the cellularly insulated wires to form a communication cable, without prior drying of the insulated conductor wires to remove residual moisture from the cellular insulation;

said combined valve and mixing means being effective to seal off the upstream portion of the screw extruder to prevent escape thereto of the gaseous material introduced in said low pressure zone.

11. A method according to claim 10, wherein said lugs in said combined means and said intense means comprise pins having an outer end profiled to match the internal contour of the barrel.

* * * * *